Feb. 17, 1953     C. F. DIETRICH ET AL     2,628,528
APPARATUS FOR OPTICALLY GAUGING PROFILES
Filed Nov. 13, 1950
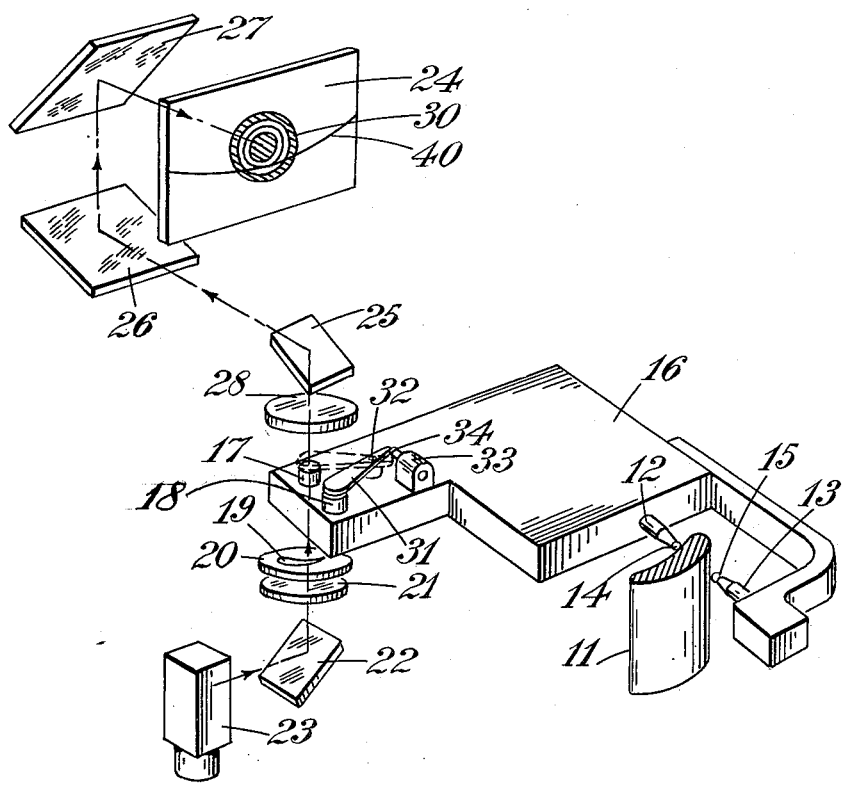
INVENTOR
C. F. Dietrich
& N. J. Smith
By Watson, Cole, Grindle & Watson Patented Feb. 17, 1953

2,628,528

UNITED STATES PATENT OFFICE 2,628,528

APPARATUS FOR OPTICALLY GAUGING PROFILES

Cornelius Frank Dietrich, Southall, and Harry John Smith, Slough, England, assignors to Optical Measuring Tools Limited, Slough, England, a British company Application November 13, 1950, Serial No. 195,399
In Great Britain November 15, 1949

4 Claims. (Cl. 88—24)

The present invention comprises improvements in or relating to apparatus for optically gauging profiles.

The present invention relates to an improvement in or modification of the apparatus described in our pending patent application Ser. No. 76,582, filed February 15, 1949, for optically gauging the contour of a workpiece, such for ex-example as a turbine blade, now Patent No. 2,542,755 of February 20, 1951.

In the aforesaid patent specification there is described such apparatus of a kind which may be defined as comprising a feeler, a workpiece-holder, means for effecting relative movement of the feeler and workpiece-holder to traverse the feeler over a profile of a workpiece held in the holder, a master profile, a screen, optical projection means for projecting an enlarged image of a part of the master profile upon the screen, the master profile and projection means being movable relative to one another by an operative connection to the means for effecting relative movement of the feeler and workpiece-holder, the magnification of the optical projection means and the relative movement of said projection means and the master profile being such as to keep upon the screen at any given moment the image of the part of the master profile which corresponds to the portion of the workpiece which the feeler is then engaging and to keep said image in proper relation to an index represented on the screen, so that deviations of the actual form from the desired contour can be observed as deviations of the said image from the index.

In the apparatus as described in the said application the index itself is a spot graticule which moves in unison with the feeler and an image of which is projected on to the screen. Providing the magnification of the optical system is properly chosen in relation to the scale of the master profile and the relative movement of the optical system and master profile, the image of the spot graticule will remain not only within the limits of the screen but will stay at rest there.

According to the present invention, instead of projecting an image of the spot graticule on to the screen, a representation of the index is directly marked upon the screen, and the optical magnification of the projection means is made such as corresponds to the use of a stationary index on the screen. Under these conditions the spot graticule can be omitted. The deviations of the workpiece from the master profile are rendered visible by reason of the fact that the image of the master profile is moved away from or into interference with the index on the screen. It will be appreciated that this movement of the image of the master profile is effected by the operative connection which exists in the apparatus between the means for moving the feeler and workpiece-holder relatively to one another on the one hand and the master profile or the optical projection means on the other, so that the deviations in the shape of the workpiece from the desired shape are automatically reproduced as deviations in the movement of the image of the master profile from a desired movement relative to the index.

Where there are two feelers to engage opposite faces of a workpiece, spaced apart and mounted for movement relative to the workpiece upon a carriage common to them, according to the present invention the carriage may carry two projection lenses spaced apart by a distance corresponding to the spacing of the feelers and a single, normally fixed, light source, master profile screen and index can co-operate with the two projection lenses. This greatly simplifies the whole projection system as compared with the apparatus described in the prior application Serial No. 76,582, filed February 15, 1949, where two spot graticules for indices had to be employed and to be mounted on the carriage and the projection lamp also had to be mounted on the carriage so as to be movable with the indices.

The following is a description by way of example of apparatus according to the present invention:

Referring to the accompanying drawing, the figure is a diagrammatic perspective view of one form of apparatus.

The apparatus is essentially mechanically similar to that described in the specification to aforesaid application Ser. No. 76,582.

A workpiece 11, the contour of which is to be gauged (in the instance shown, a gas-turbine blade) is fixed into any suitable stationary holder. Feelers 12, 13 having ball-tips 14, 15, are carried by a carriage 16 which can be moved by an operator so that one or other of the ball-tips 14 or 15 can be brought into engagement with the blade and made to traverse a desired portion of the blade 11 in contact therewith. The carriage 16 is movable on guides in any direction in a horizontal plane but prevented by the guides from turning angularly. Optical projection lenses 17, 18 are also carried by the mounting 16 and it will be seen that each lens copies the movements of the ball-tip 14 or 15. The distance between the axes of the lenses 17, 18 is equal to and parallel to the distance between the centres of the ball-tips 14, 15.

A stationary master profile 19 marked on a transparent graticule 20, is arranged in front of a collimating lens 21 above a mirror 22 which deflects light from a source 23 through the graticule and lenses. A stationary viewing screen 24 is arranged in the focal plane of the image of the master profile 19 cast by either lens 17 or 18. Between the lenses 17, 18 and the screen 24 are mirrors 25, 26, 27 which serve to bring the light by a convenient path to a position where the screen 24 is easily visible to the operator of the carriage 16. There may also in some cases be a further fixed lens 28 if required as hereinafter explained. All these parts are, in an actual instrument enclosed in a suitable housing, not shown in the drawing, but similar, if desired, to the construction shown in the aforesaid application Ser. No. 76,582.

The master profile 19 corresponds in shape to the portion of the blade 11 to be gauged but is set out to a different scale, as hereinafter explained. An index 30 in the form of three concentric rings, representing respectively permissible maximum, zero, and minimum tolerance, is depicted on the screen 24, either by engraving or photographically or otherwise.

A shutter arm 31 is pivoted at 32 on carriage 16 so that it can overlie, in one position, the lens 17 and in another position the lens 18. A solenoid 33 on the carriage 16 has a core 34 pivoted to the shutter arm 31. An internal spring 35 in the solenoid urges the core outwards, thus moving the shutter arm into the position shown, over lens 18. If the solenoid is energised however it overcomes the spring and moves the shutter plate to obturate lens 17. If the operator engages the feeler 12 with ball point 14 with the blade 11, as shown, the lens 17 comes into line with the graticule 19 and projects its image on to the screen 24 alongside the spot 30. If the feeler 13 is engaged with the other face of the blade 11, the lens 18 comes into operative position and solenoid 33 must be energised to move the shutter plate 32 out of the way.

The size of the master profile 19 is arrived at from the following considerations: If the magnifying power of the projection lenses 17, 18 is M (and there is no field lens 28) the master profile 19 is drawn on the graticule 20

$$\left(1 + \frac{1}{M}\right)$$

times larger than the corresponding contour of the blade and provided the projection lenses 17, 18 and the feelers 14, 15 move through equal distances with each movement, which is ensured by fixing the projection system and the feeler on the same carriage 16, the index 30 can be marked permanently on the screen 24. Light from all points on the master profile 19 lying (for optical purposes) on or near to the principal axis of the lens will pass through a common focus on the screen. A blade whose contour deviates from the shape of the master profile will result in an image of the master profile being produced on the screen which shows the deviation of the actual from the desired contour as deviations of the image from the index.

As the feelers are provided with ball tips, taking these as of radius $r$, the radius of the middle ring of the index is made $(1+M)$ times larger, that is of radius $r(1+M)$, where M is the magnifying power of the projection system.

Both the size of the master profile and the index are therefore dependent on the magnifying power of the projection system.

In operation, the mounting is moved to bring one of the ball tips 14, 15 into engagement with a desired portion of the blade and thereafter the ball tip is moved over the contour of the portion. As the ball tip moves, the projection system moves with it, and an image of a part of the master profile becomes projected on to the screen, as seen at 40 in the drawing, and as the projection system scans the master profile, the image moves lengthwise across the screen past the index so that the deviations can be observed.

If it is desired to alter the magnification of the image, the magnifying power of the projection system is changed, and both the master profile and the index on the screen have to be interchanged with others of different size in accord with the algebraic relations explained above.

If desired, the need for having to change both the master profile and index for each magnification desired, is obviated, the index only being required to be changed. This can be done by arranging that the projection lenses 17, 18 do not bring light to a focus on the screen as already described, but whichever of these lenses is in use collimates it. A lens 28 of large diameter is then arranged so as to be stationary between the screen and the projection system and receives the collimated light from the projection lenses and focusses it upon the screen 24.

If the object focal length of the projection lens 17 or 18 is $F_1$ and the image focal length of the lens 28 is $F_2$, the effective magnification of the master profile in projecting an image thereof on to the screen will be $$\frac{F_2}{F_1} = M_1$$

say. Also if $r$ is the radius of the ball tips 14 or 15 as before, the middle ring of the index on the screen the radius is made $M_1$ times larger, that is of radius $rM_1$.

In this alternative form then, magnification of the image of the master profile can be changed, simply by replacing the lens 17 or 18 in the projection system with one of different focal length, thereby changing the magnifying power of the two systems without having to change the master profile for one of different size. The master profile is made the same size as the contour blade it represents. The index 30 however, being proportional to the magnifying power, has to be changed with each magnification desired.

In operation, the projection system moves at right angles to the principal axis of the lens system as the projection system scans the master profile, and as the diameter of the lens system is large, it always receives light from the projection system and if the blade has the exact shape of the master profile the light is brought to a common focus on the screen as in the first form of apparatus described above. Deviations shown by imperfectly shaped blades are also observed as before.

It is clear that the present invention considerably simplifies the prior arrangement as described in aforesaid patent application Ser. No. 76,582, and while incorporating all the technical advantages of the prior arrangement, the invention also provides efficient apparatus which because of its simplified optical system requires less work to make and costs less.

We claim:

1. Apparatus for optically gauging profiles comprising in combination a feeler, a workpiece holder, means for effecting relative movement of the feeler and workpiece holder to traverse the feeler over a profile of a workpiece held in the holder, a master profile element bearing a master profile, a screen, optical projection lens for projecting an enlarged image of a part of the master profile upon the screen, the master profile element and projecting lens being mounted so as to be movable relatively to one another transversely of the lens axis, an operative connection from the means for effecting relative movement of the feeler and workpiece holder to effect a corresponding relative movement of the master profile element and projection lens, the magnification of the optical projection lens being such as when traverse of the feeler is effected will keep at a given spot on the screen the image of the part of the master profile which corresponds to the portion of the workpiece which the feeler is engaging and an index spot marked directly upon the screen in proper relation to the image of the master profile cast by the projection lens.

2. Apparatus as claimed in claim 1 wherein there are two feelers to engage opposite faces of a workpiece, spaced apart and mounted for movement relative to the workpiece upon a carriage common to them, the carriage carries two projection lenses spaced apart by a distance corresponding to the spacing of the feelers and a single normally fixed, light source, master profile, screen and index co-operate with the two projection lenses.

3. Apparatus as claimed in claim 2 wherein shutter means are provided for obturating either projection lens at will.

4. Apparatus as claimed in claim 3 wherein the shutter means are actuated by an electromagnet.

CORNELIUS FRANK DIETRICH.
HARRY JOHN SMITH.

REFERENCES CITED

The following references are of record in the file of this patent:

UNITED STATES PATENTS

| Number | Name | Date |
|---|---|---|
| 2,451,155 | De Boer | Oct. 12, 1948 |